United States Patent
Arbeiter et al.

(10) Patent No.: US 6,422,222 B1
(45) Date of Patent: Jul. 23, 2002

(54) BI-TURBOCHARGER INTERNAL COMBUSTION ENGINE WITH EXHAUST GAS RECYCLING

(75) Inventors: Erich Arbeiter, Plochingen; Hans Fausten, Winterbach; Marcel Hassler, Esslingen; Axel Löffler, Plochingen; Siegfried Weber, Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/529,216
(22) PCT Filed: Jun. 24, 1999
(86) PCT No.: PCT/EP99/04405
§ 371 (c)(1),
(2), (4) Date: Jun. 19, 2000
(87) PCT Pub. No.: WO00/08319
PCT Pub. Date: Feb. 17, 2000

(30) Foreign Application Priority Data

Aug. 8, 1998 (DE) ........................... 198 35 978

(51) Int. Cl.⁷ ............................. F02M 25/07
(52) U.S. Cl. ............... 123/568.2; 123/568.12; 60/605.2
(58) Field of Search ............ 123/568.11, 568.12, 123/568.17, 568.18, 568.2, 568.26, 568.27, 568.29, 605.2

(56) References Cited

U.S. PATENT DOCUMENTS

| | | | | |
|---|---|---|---|---|
| 3,530,843 A | * | 9/1970 | Fessenden | 123/568.11 |
| 5,607,010 A | | 3/1997 | Schönfeld et al. | 60/605.2 |
| 5,611,203 A | * | 3/1997 | Henderson et al. | 60/605.2 |
| 5,927,257 A | * | 7/1999 | Hackett | 123/568.26 |
| 6,116,223 A | * | 9/2000 | Feucht | 123/568.11 |

FOREIGN PATENT DOCUMENTS

| | | | |
|---|---|---|---|
| DE | 36 33 405 A1 | 4/1988 | |
| DE | 40 38 918 A1 | 6/1992 | |
| DE | 44 16 572 C1 | 4/1995 | |
| DE | 195 24 603 C1 | 8/1996 | |
| EP | 0 790 393 A1 | 8/1997 | |
| GB | 1551833 A * | 9/1979 | 60/605.2 |
| WO | 96/28648 | 9/1996 | |
| WO | WO-98/07976 A1 * | 2/1998 | 60/605.2 |

* cited by examiner

Primary Examiner—Willis R. Wolfe
(74) Attorney, Agent, or Firm—Crowell & Moring, LLP

(57) ABSTRACT

An internal combustion engine has a plurality of cylinders which are arranged in two rows, two exhaust-gas turbochargers which are driven in each case by the exhaust gases from the cylinders of a cylinder row, and exhaust-gas recirculation. Two exhaust-gas discharge lines branch off, upstream of the respective exhaust-gas turbocharger, part of the exhaust gases from the cylinders of a cylinder row to be recirculated and supply this part to a common recirculation line. By way of the common recirculation line, the exhaust gases to be recirculated are supplied, downstream of the exhaust-gas turbochargers, to an air supply. At least one valve, which serves as an exhaust-gas recirculation valve and by which the quantity of recirculated exhaust gases can be set, is provided. The valve has a stop by which a communicating connection made between the two exhaust-gas discharge lines can be shut off.

33 Claims, 2 Drawing Sheets

BI-TURBOCHARGER INTERNAL COMBUSTION ENGINE WITH EXHAUST GAS RECYCLING

BACKGROUND AND SUMMARY OF THE INVENTION

The present invention relates to an internal combustion engine which is charged by two exhaust-gas turbochargers and has exhaust-gas recirculation.

DE 36 33 405 A1 discloses a diesel internal combustion engine, the cylinders of which are arranged in two rows, the exhaust gases from each cylinder row driving an exhaust-gas turbocharger, and the exhaust-gas turbochargers in the known internal combustion engine serving in each case for charging only the cylinders of the associated cylinder row.

DE 44 16 572 C1 discloses an internal combustion engine, the cylinders of which are charged with the aid of two parallel-connected exhaust-gas turbochargers, the exhaust-gas turbochargers being driven by the exhaust gases from the cylinders. Furthermore, the known internal combustion engine has exhaust-gas recirculation, in which part of the exhaust gases is branched off before they enter a turbine of one of the exhaust-gas turbochargers. This part is admixed with the intake air upstream of a compressor of this exhaust-gas turbocharger.

The present invention is concerned with the problem of improving the power behaviour of an internal combustion engine of the type mentioned above.

The exhaust-gas recirculation of the internal combustion engine according to the invention is based on the principle of returning the exhaust gases from the pressure level prevailing upstream of the turbine inlet to the pressure level prevailing downstream of the compressor outlet (if appropriate, downstream of a charge-air cooler). In this case, the separate cylinder rows or cylinder banks are in each case assigned separate exhaust-gas discharge lines which, for recirculating the exhaust gas, open into a common recirculation line. As a result, the exhaust-gas part-quantities from the two cylinder banks which are to be returned are intermixed with one another before they are introduced through the recirculation line into the air supply or admixed with the charge air. This arrangement affords the following advantages.

Only one common air collector, a so-called "airbox", in which only one charge-pressure sensor is arranged, is required for the charge air. Moreover, only one charge regulating circuit is required, which, where appropriate, carries out difference compensation for the two turbochargers. For exhaust-gas recirculation, only one exhaust-gas recirculation regulating circuit is necessary. By appropriate valve means, the circuit regulates or sets the exhaust-gas recirculation rate necessary in each case. Furthermore, in the arrangement according to the invention, a common charge-air cooler can be used. The cooler may expediently be equipped with a common throttle valve, in order, where appropriate, to increase the feed gradient for exhaust-gas recirculation. Moreover, only one exhaust-gas recirculation heat exchanger, which is to be arranged in the common recirculation line, needs to be provided for cooling the recirculated exhaust gases.

Since the exhaust-gas discharge lines assigned in each case to a cylinder bank open into a common recirculation line, a communicating connection is made between the two exhaust-gas discharge lines. The common recirculation line is required, inter alia, in order to achieve pressure equalization between the exhaust-gas turbochargers which do not operate in an entirely identical way. An essential feature of the internal combustion engine according to the invention is stop means by which the communicating connection made between the two exhaust-gas discharge lines can be shut off.

This measure is based on the knowledge that, when the internal combustion engine is in a relatively low rotational speed range, pressure pulsations occur in the cylinder banks. Because of the communicating connection between the exhaust-gas discharge lines, these pulsations generate or induce mass oscillations. On account of these mass oscillations, some of the pulsation energy to the overall exhaust-gas energy is lost in the form of wall heat losses and frictional losses in the interconnected exhaust-gas discharge lines. The result of this is that only a relatively low charge pressure can build up in the relatively low rotational speed range mentioned, so that a comparatively low torque is available. This leads to the performance of the internal combustion engine likewise being relatively low.

Pulse charging essentially takes place in the low rotational speed range mentioned. At higher rotational speeds, however, only ram charging takes place. In ram charging, the mass oscillations mentioned, along with the accompanying consequences, do not occur. During the acceleration of the internal combustion engine, the transition from pulse charging to pure ram charging has a significantly noticeable effect, a power jump of this kind being undesirable.

With the aid of the stop means proposed according to the invention, this communicating connection between the exhaust-gas discharge lines can be broken or shut off, with the result that the pressure pulsations cannot generate any mass oscillations, so that the losses caused thereby do not occur. A considerable power rise or torque increase is consequently obtained for the internal combustion engine according to the invention in the low rotational speed range mentioned.

By designing the internal combustion engine in the way according to the invention, when the internal combustion engine is at relatively low critical rotational speeds, the exhaust-gas discharge lines can be separated from one another, and the exhaust-gas turbochargers can then be charged completely independently of one another, thus resulting in a maximum power rise for the internal combustion engine. On the other hand, in non-critical rotational speed ranges, the advantages of the common simple regulating circuits for exhaust-gas recirculation can be utilized.

Furthermore, should the valve means serving as an exhaust-gas recirculation valve be arranged upstream of an exhaust-gas heat exchanger arranged, if appropriate, in the recirculation line, it is possible to ensure that, when the stop means are opened, only hot exhaust gas flows through the valve means, thus preventing the situation in which condensate, possibly occurring in the exhaust-gas heat exchanger, leads to sooting-up problems in and sticking of the valve means.

The performance of an internal combustion engine according to the invention can be increased in a particular way, in that, when the internal combustion engine is in a relatively low rotational speed range, the communicating connection between the exhaust-gas discharge lines is shut off by the stop means. Exhaust-gas recirculation can then also be shut off. With the aid of these measures, the abovementioned power rise of the internal combustion engine is obtained in the low rotational speed range in which the exhaust-gas discharge lines are shut off. In this context, the fact that, where appropriate, no exhaust-gas recirculation serving for exhaust-gas emission control takes place during this time can be ignored. This is because the increased performance or increased available engine torque makes it possible to leave this engine operating phase quickly by virtue of the increased acceleration capacity. Immediately after leaving the critical rotational speed range, the stop means can connect the exhaust-gas discharge lines to one another again, and exhaust-gas recirculation, cut off if appropriate, can be reactivated, so that the internal combustion engine then works in engine operating ranges in which optimum exhaust-gas emission control can take place.

Other important features and advantages of the invention may be understood from the claims, from the drawings and from the accompanying figure description with reference to the drawings.

The features mentioned above and those still to be explained below can be used not only in the combination specified in each case, but also in other combinations or alone, without departing from the scope of the present invention.

Preferred exemplary embodiments of the invention are illustrated in the drawings and are explained in more detail in the following description.

DESCRIPTION OF THE PREFERRED EMBODIMENTS

Figure 1:
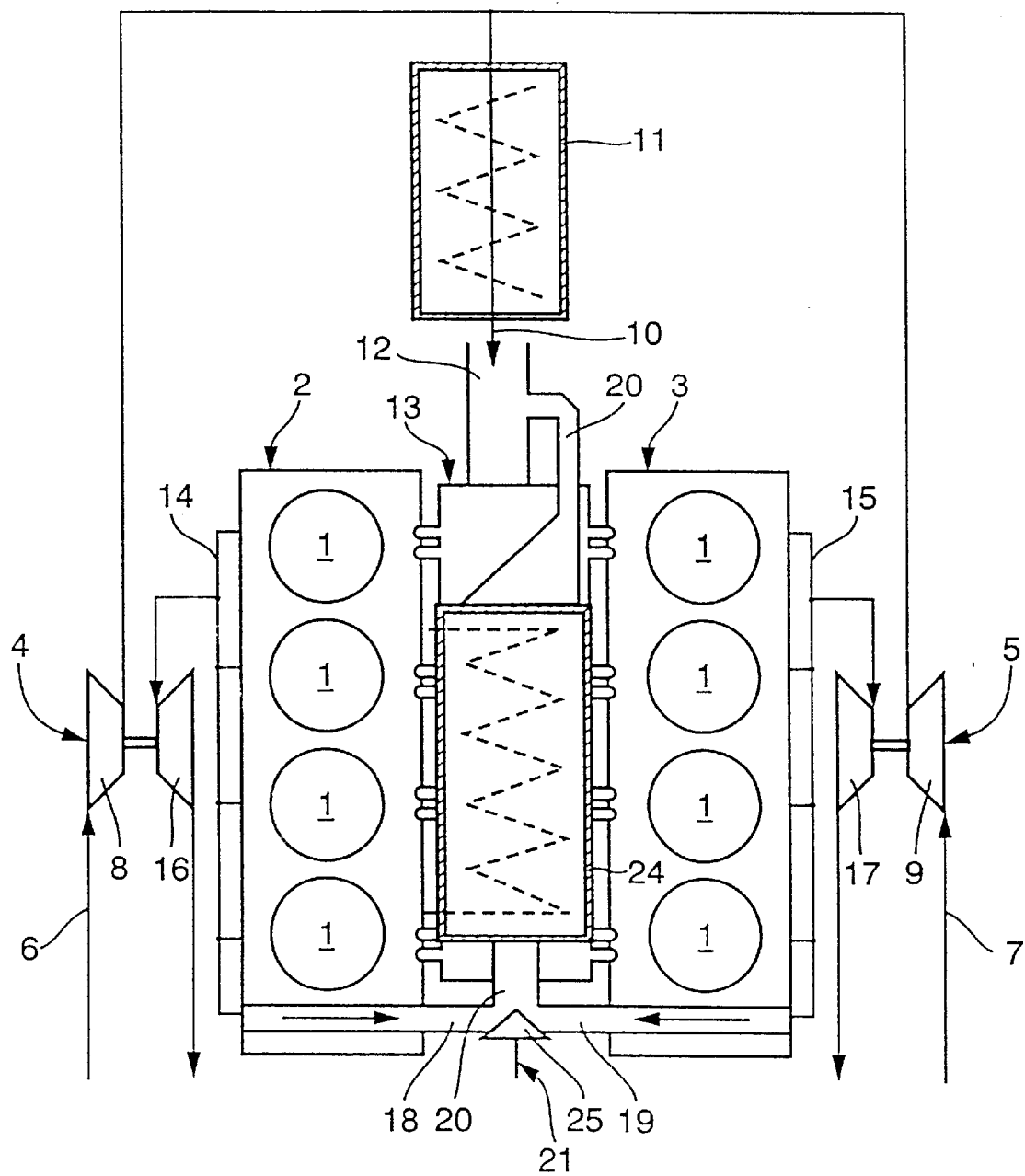
FIG. 1 shows diagrammatically a basic illustration of a first embodiment of an internal combustion engine according to the invention.
Figure 2:
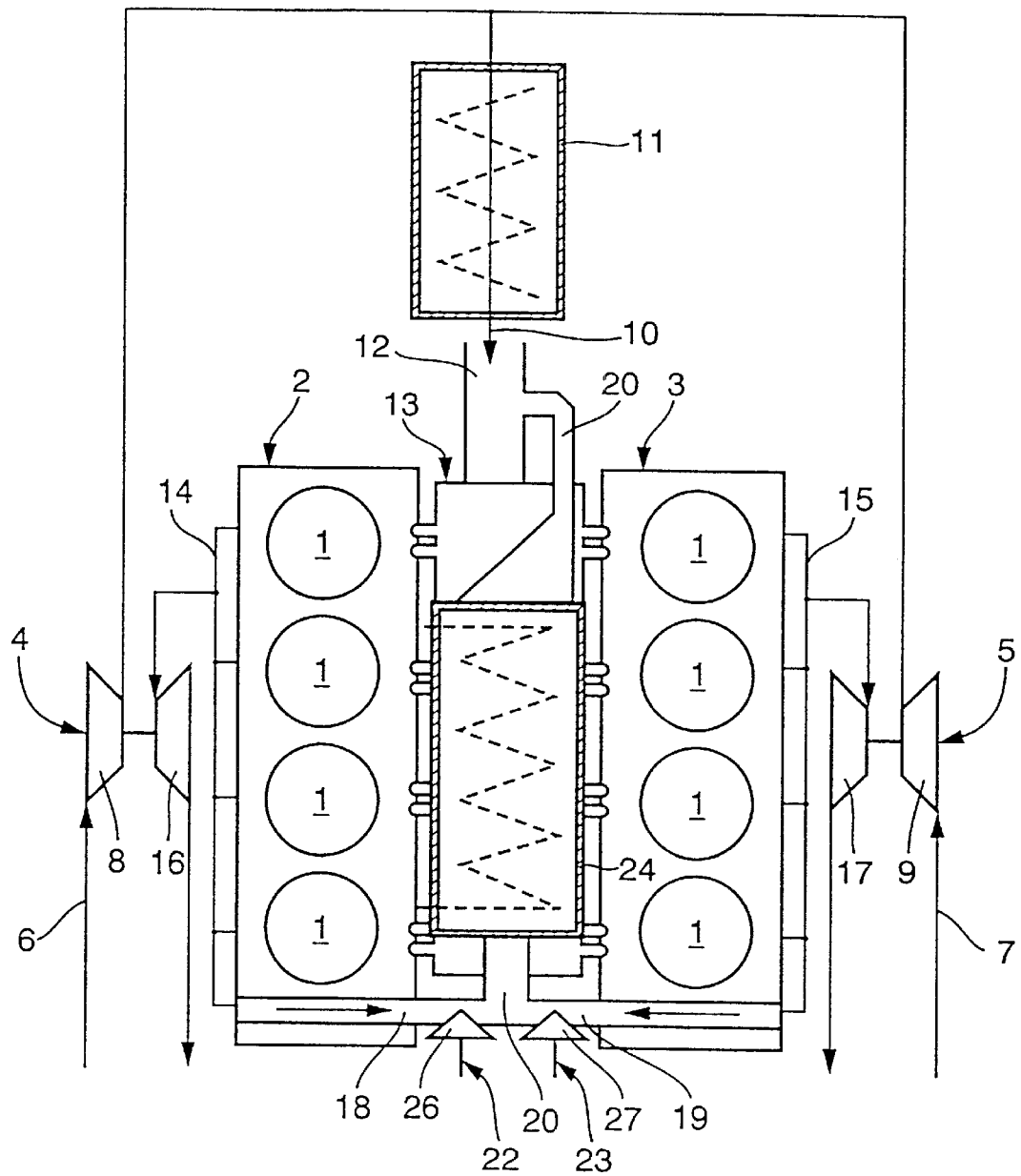
FIG. 2 shows diagrammatically a basic illustration of a second embodiment of the internal combustion engine according to the invention.

According to FIGS. 1 and 2, an internal combustion engine according to the invention has, for example, eight cylinders 1 which are divided into two cylinder rows 2 and 3, each with four cylinders 1. Preferably, the two cylinder rows 2 and 3 of the internal combustion engine are arranged in a V-shaped manner, so that the internal combustion engine illustrated in the exemplary embodiments is in each case an eight-cylinder V-engine. In a V-engine, the cylinder rows 2 and 3 are designated, as a rule, as cylinder banks.

Each cylinder row or cylinder bank 2 and 3 is assigned a separate exhaust-gas turbocharger 4, 5, in such a way that the exhaust gases from one cylinder bank 2 serve for driving one exhaust-gas turbocharger 4 and the exhaust gases from the other cylinder bank 3 serve for driving the other exhaust-gas turbocharger 5.

The exhaust-gas turbochargers 4 and 5 in each case suck up fresh air via a fresh-air supply line 6, 7, the fresh air in each case being compressed in a compressor 8, 9 of the respective exhaust-gas turbocharger 4, 5 to form charge air. Downstream of the compressors 8 and 9, the charged charge air is supplied to a common charge-air line 10, in which a charge-air cooler 11 is arranged. Such a charge-air cooler 11 causes the charge air heated during compressor charging to be cooled, with the result that the mass flow of charge air can be increased markedly.

The cooled charge air passes from the charge-air line 11 into an air supply 12 of the internal combustion engine, the said air supply opening into an air collector 13 which distributes the charged air to the cylinders 1 of the two cylinder banks 2 and 3.

After combustion in the cylinders 1, the exhaust gases pass in each case, via two exhaust-gas collecting lines 14 and 15 assigned in each case to a cylinder bank 2, 3, into a turbine 16, 17 of the respective exhaust-gas turbocharger 4, 5, with the result that the said turbine is driven, in order, in turn, to drive the compressor 8, 9 coupled to it. Downstream of the turbines 16 and 17, the expanded exhaust gases are supplied to in each case one or alternatively a common exhaust-gas emission control device and silencer device.

Connected in each case to the two exhaust-gas collecting lines 14 and 15 are exhaust-gas discharge lines 18 and 19 which are both part of an exhaust-gas recirculation system. The two exhaust-gas discharge lines 18 and 19 open into a common recirculation line 20, in which an exhaust-gas recirculation heat exchanger is arranged, in order to extract heat energy from the hot combustion exhaust gases. The exhaust-gas recirculation line 20 opens into the air supply 12 of the internal combustion engine, with the result that combustion exhaust gases can be admixed with the charged fresh air before the latter enters the air collector 13.

Moreover, the exhaust-gas recirculation has valve means 21 (FIG. 1) or 22 and 23 (FIG. 2) by which the quantity of recirculated exhaust gases can be set or regulated.

Whereas, in conventional internal combustion engines, these valve means 21; 22, 23 are arranged in the region where the recirculation line 20 opens into the air supply 12, in the embodiments of the internal combustion engine according to the invention the said valve means 21; 22, 23 are arranged in the region where the exhaust-gas discharge lines 18 and 19 open into the recirculation line 20.

According to the embodiment illustrated in FIG. 1, the valve means 21 also comprises a stop means 25 and is arranged in such a way that, on the one hand, the exhaust-gas discharge lines 18 and 19 and also the recirculation line 20 can be shut off and, on the other hand, the inflow quantity of exhaust gases from the exhaust-gas discharge lines 18 and 19 into the recirculation line 20 and therefore the exhaust-gas recirculation rate can be set. In this case, the valve means 21 together with the stop means 25 serves as an exhaust-gas recirculation valve.

In contrast to this, the valve means 22 and 23 in the embodiment illustrated in FIG. 2 comprise a first and a second stop means 26 and 27 which are arranged in each case in one of the exhaust-gas discharge lines 18 and 19 and can shut off these before they open into the recirculation line 20. Furthermore, these stop means 26 and 27 are designed in such a way that, with their aid, the through flow quantity of exhaust gases through the exhaust-gas discharge lines 18 and 19 can be set, preferably in parallel, so that, here too, the valve means 22 and 23 comprising the stop means 26 and 27 serve as an exhaust-gas recirculation valve, by means of which the exhaust-gas recirculation rate can be set.

With the aid of the valve means 21 or 22 and 23, the communicating connection made between the exhaust-gas discharge lines 18 and 19 via their opening into the common recirculation line 20 can be shut off or broken, with the result that the cylinder banks 2 and 3 are completely uncoupled from one another on the exhaust-gas side. In the method, proposed according to the invention, for operating the internal combustion engine according to the invention, this is utilized to avoid attenuating the ram charging, taking place at relatively low rotational speeds of the internal combustion engine, by interactions on the exhaust-gas side between the cylinder banks 2 and 3. As already mentioned further above, these interactions at low rotational speeds are predominantly due to pressure pulsations being formed between the two cylinder banks 2 and 3 and inducing mass oscillations in the exhaust-gas discharge lines 18 and 19. These mass oscillations then have the result that frictional and heat losses occur to an increased extent, these energy losses reducing the charge pressure capable of being achieved.

When the cylinder banks 2 and 3 are uncoupled from one another on the exhaust-gas side by means of the proposed arrangement of the valve means or stop means 21, 25 (FIG. 1) or 22, 23 and 26, 27 (FIG. 2), a higher charge pressure can thus be achieved.

According to the invention, therefore, the internal combustion engine is operated in such a way that the connection on the exhaust-gas side between the cylinder banks 2 and 3 is shut off at rotational speeds at which the pulse charging mentioned takes place. Only in rotational speed ranges in which essentially pure ram charging occurs is the connection on the exhaust-gas side between the cylinder banks 2 and 3 restored. In this way, increased engine power is available, for example in the starting range, to a motor vehicle equipped with the internal combustion engine according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Internal combustion engine comprising:
   cylinder banks including a plurality of cylinders which are arranged in two rows,
   two exhaust-gas turbochargers which are driven in each case by exhaust gases from the cylinders of the cylinder banks,
   an exhaust-gas recirculation device comprising two exhaust-gas discharge lines which, in each case, branch off, upstream of the respective exhaust-gas turbocharger, a part of the exhaust gases from the cylinders of the cylinder banks which is to be recirculated, and which supply said part to a common recirculation line by which the part of the exhaust gases to be recirculated can be supplied, downstream of the exhaust-gas turbochargers, to an air supply, and
   at least one valve which serves as an exhaust-gas recirculation valve and by which the quantity of returned exhaust gases can be set, the at least one valve having a stop by which a communicating connection made between the two exhaust-gas discharge lines can be shut off,
   wherein the at least one valve is arranged in a region of a common connection point at which the exhaust-gas discharge lines are connected to the recirculation line so as to communicate with one another, and
   wherein the at least one valve includes a valve component which is arranged at the connection point, contains the stop and serves as an exhaust-gas recirculation valve.

2. Internal combustion engine according to claim 1, wherein the recirculation line can also be shut off by the stop.

3. Internal combustion engine according to claim 1, and further comprising an exhaust-gas recirculation heat exchanger, in which the recirculated exhaust gases are cooled, arranged in the recirculation line before the latter opens into the air supply.

4. Internal combustion engine according to claim 1, and further comprising an air collector, from which the cylinders are supplied with charged air, arranged in the air supply upstream of the cylinders.

5. Internal combustion engine according to claim 1, and further comprising a charge-air cooler, in which the charge air supplied to the cylinders is cooled, arranged downstream of the exhaust-gas turbochargers.

6. Internal combustion engine according to claim 5, wherein the recirculation line opens into the air supply downstream of the charge-air cooler.

7. Internal combustion engine according to claim 1, wherein communication between the exhaust-gas discharge lines is shut off by the stop in a relatively low rotational speed range of the internal combustion engine and opened in other rotational speed ranges.

8. Internal combustion engine according to claim 7, wherein when the communication is shut off, no exhaust gases are recirculated into the air supply.

9. Internal combustion engine according to claim 7 wherein the relatively low rotational speed range covers rotational speeds from 0 to 2000 revolutions per minute.

10. Internal combustion engine according to claim 9, wherein the relatively low rotational speed range covers rotational speeds from 800 to 2000 revolutions per minute.

11. Internal combustion engine according to claim 10, wherein the relatively low rotational speed range covers rotational speeds from 1200 to 1800 revolutions per minute.

12. Internal combustion engine comprising:
    cylinder banks including a plurality of cylinders which are arranged in two rows,
    two exhaust-gas turbochargers which are driven in each case by exhaust gases from the cylinders of the cylinder banks,
    an exhaust-gas recirculation device comprising two exhaust-gas discharge lines which, in each case, branch off, upstream of the respective exhaust-gas turbocharger, a part of the exhaust gases from the cylinders of the cylinder banks which is to be recirculated, and which supply said part to a common recirculation line by which the part of the exhaust gases to be recirculated can be supplied, downstream of the exhaust-gas turbochargers, to an air supply, and
    at least one valve which serves as an exhaust-gas recirculation valve and by which the quantity of returned exhaust gases can be set, the at least one valve having a stop by which a communicating connection made between the two exhaust-gas discharge lines can be shut off,
    wherein the at least one valve includes two valve components, each of which is arranged in one of the exhaust-gas discharge lines upstream of a respective opening thereof into the recirculation line, and wherein each valve component contains a stop and serves as an exhaust-gas recirculation valve.

13. Internal combustion engine according to claim 12, wherein the recirculation line can also be shut off by the stop.

14. Internal combustion engine according to claim 12, and further comprising an exhaust-gas recirculation heat exchanger, in which the recirculated exhaust gases are cooled, arranged in the recirculation line before the latter opens into the air supply.

15. Internal combustion engine according to claim 12, and further comprising an air collector, from which the cylinders are supplied with charged air, arranged in the air supply upstream of the cylinders.

16. Internal combustion engine according to claim 12, and further comprising a charge-air cooler, in which the charge air supplied to the cylinders is cooled, arranged downstream of the exhaust-gas turbochargers.

17. Internal combustion engine according to claim 16, wherein the recirculation line opens into the air supply downstream of the charge-air cooler.

18. Internal combustion engine according to claim 12, wherein communication between the exhaust-gas discharge lines is shut off by the stop in a relatively low rotational speed range of the internal combustion engine and opened in other rotational speed ranges.

19. Internal combustion engine according to claim 18, wherein when the communication is shut off, no exhaust gases are recirculated into the air supply.

20. Internal combustion engine according to claim 18 wherein the relatively low rotational speed range covers rotational speeds from 0 to 2000 revolutions per minute.

21. Internal combustion engine according to claim 20, wherein the relatively low rotational speed range covers rotational speeds from 800 to 2000 revolutions per minute.

22. Internal combustion engine according to claim 21, wherein the relatively low rotational speed range covers rotational speeds from 1200 to 1800 revolutions per minute.

23. Internal combustion engine comprising:
cylinder banks including a plurality of cylinders which are arranged in two rows,
two exhaust-gas turbochargers which are driven in each case by exhaust gases from the cylinders of the cylinder banks,
an exhaust-gas recirculation device comprising two exhaust-gas discharge lines which, in each case, branch off, upstream of the respective exhaust-gas turbocharger, a part of the exhaust gases from the cylinders of the cylinder banks which is to be recirculated, and which supply said part to a common recirculation line by which the part of the exhaust gases to be recirculated can be supplied, downstream of the exhaust-gas turbochargers, to an air supply,
at least one valve which serves as an exhaust-gas recirculation valve and by which the quantity of returned exhaust gases can be set, the at least one valve having a stop by which a communicating connection made between the two exhaust-gas discharge lines can be shut off, and
a throttle valve arranged in the air supply upstream of an opening of the recirculation line into the air supply.

24. Internal combustion engine according to claim 23, wherein the recirculation line can also be shut off by the stop.

25. Internal combustion engine according to claim 23, and further comprising an exhaust-gas recirculation heat exchanger, in which the recirculated exhaust gases are cooled, arranged in the recirculation line before the latter opens into the air supply.

26. Internal combustion engine according to claim 23, and further comprising an air collector, from which the cylinders are supplied with charged air, arranged in the air supply upstream of the cylinders.

27. Internal combustion engine according to claim 23, and further comprising a charge-air cooler, in which the charge air supplied to the cylinders is cooled, arranged downstream of the exhaust-gas turbochargers.

28. Internal combustion engine according to claim 27, wherein the recirculation line opens into the air supply downstream of the charge-air cooler.

29. Internal combustion engine according to claim 23, wherein communication between the exhaust-gas discharge lines is shut off by the stop in a relatively low rotational speed range of the internal combustion engine and opened in other rotational speed ranges.

30. Internal combustion engine according to claim 29, wherein when the communication is shut off, no exhaust gases are recirculated into the air supply.

31. Internal combustion engine according to claim 29 wherein the relatively low rotational speed range covers rotational speeds from 0 to 2000 revolutions per minute.

32. Internal combustion engine according to claim 31, wherein the relatively low rotational speed range covers rotational speeds from 800 to 2000 revolutions per minute.

33. Internal combustion engine according to claim 32, wherein the relatively low rotational speed range covers rotational speeds from 1200 to 1800 revolutions per minute.

\* \* \* \* \*